United States Patent [19]

Flint et al.

[11] Patent Number: 5,226,695

[45] Date of Patent: Jul. 13, 1993

[54] FASCIA TO FENDER ATTACHMENT

[75] Inventors: Gerald A. Flint, Rochester Hills; Edward Zentner, Clarkston, both of Mich.

[73] Assignee: General Motors Corporation, Detroit, Mich.

[21] Appl. No.: 901,636

[22] Filed: Jun. 19, 1992

[51] Int. Cl.$^5$ .............................................. B62D 27/06
[52] U.S. Cl. .................................... 296/191; 296/901; 403/381; 52/595; 293/121
[58] Field of Search ............... 296/191, 185, 194, 901; 403/381, 375, 345; 52/595; 293/126, 121

[56] References Cited

U.S. PATENT DOCUMENTS

| | | | |
|---|---|---|---|
| 595,510 | 12/1897 | Adams | 403/381 |
| 3,875,661 | 4/1975 | Lidstrom et al. | 296/28 |
| 4,438,971 | 3/1984 | Zaydel et al. | 296/191 |
| 4,597,153 | 7/1986 | Zaydel | 29/434 |
| 4,597,603 | 7/1986 | Trabert | 296/194 |
| 4,607,877 | 8/1986 | Shelton | 296/191 |
| 4,838,593 | 6/1989 | Fleming et al. | 293/126 |
| 4,966,245 | 10/1990 | Pfister | 180/68.6 |
| 4,973,102 | 11/1990 | Bien | 296/187 |
| 5,066,057 | 11/1991 | Furuta et al. | 293/121 |

*Primary Examiner*—Robert R. Song
*Attorney, Agent, or Firm*—Raymond I. Bruttomesso, Jr.

[57] ABSTRACT

A first plastic body panel has an appearance panel with an appearance surface and an adjoining edge. The body panel has a tongue projecting from the adjoining edge generally parallel and recessed from the appearance surface. The tongue has an appearance side and a hidden side with the hidden side having a plurality of ribs. A second plastic body panel has an appearance panel with an appearance surface and an adjoining edge. The second plastic body panel has an inboard "L" shaped flange spaced and generally parallel to the appearance panel at the adjoining edge. The appearance panel and the flange of the second body panel define a slot at the adjoining edge for receiving the tongue of the first plastic body panel for slideably connecting the panels with the ribs of the tongue engaging the inboard "L" shaped flange. The appearance surfaces are coplanar at the adjoining edges whereby the panels can move relative to each other while maintaining the appearance surfaces coplanar at the adjoining edges.

3 Claims, 3 Drawing Sheets

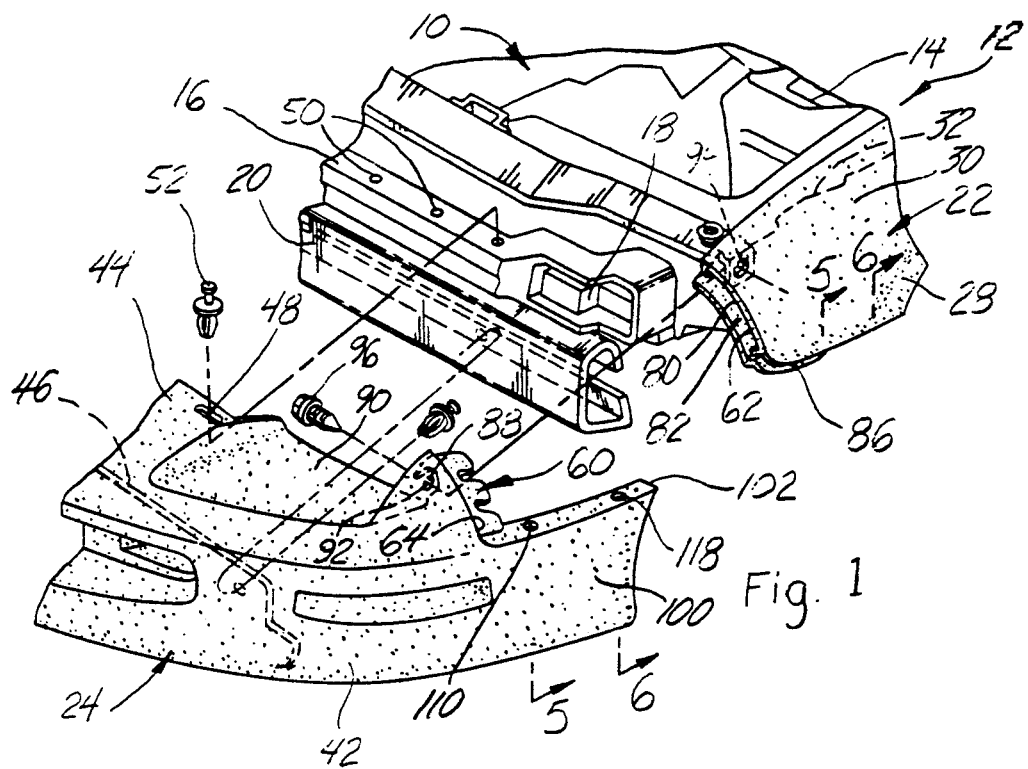
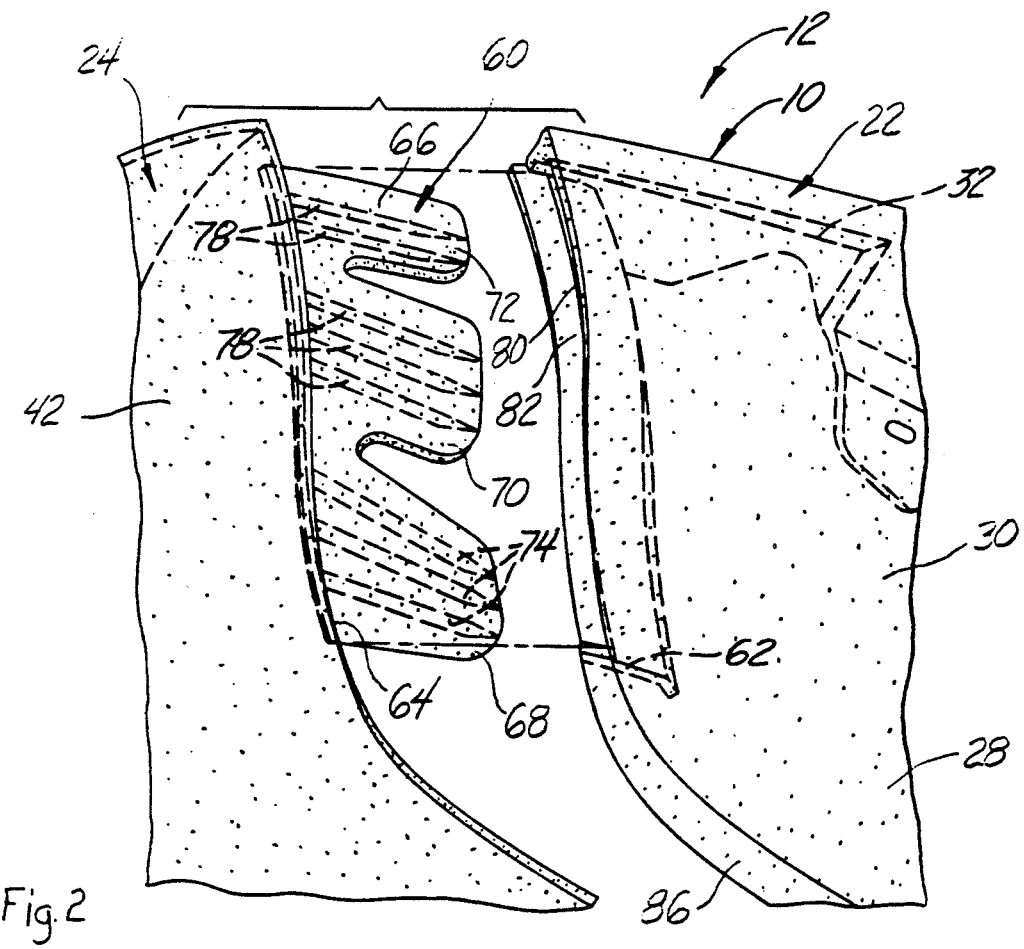

FASCIA TO FENDER ATTACHMENT

BACKGROUND OF THE INVENTION

Field of the Invention

This invention relates to joining of a plastic fascia to a plastic fender of a motor vehicle and more particularly to a ribbed tongue on one received by a slot on the other to allow for different rates of thermal expansion and hydroscopic growth of the fascia and the fender.

It is well known in motor vehicles to provide mounted decorative plastic outer body panels on a metal substructure to define the outer appearance surface of the vehicle body. The use of such plastic panels is desirable in order to obtain vehicle design goals such as weight reduction and corrosion resistance. Furthermore, relatively soft flexible plastic body outer panels offer a lessened susceptibility to damage from minor impact.

A shortcoming of the use of plastic body outer panels to define the outer appearance surface of a motor vehicle is that the plastic panel cannot be welded to the adjacent panels or the underlying metal substructure. This is further complicated by the fact that the plastic panel and the metal substructure have substantially different rates of thermal expansion. Furthermore, plastic panels are known to have a high rate of hydroscopic growth causing the plastic material to grow substantially in dimension under condition of high humidity.

It is also known to attach adjacent outer body panels, such as the front fascia and the front fender, together to form a continuous outer surface for structural, aerodynamic and styling reasons. It is known to manufacture the body panels with flanges that are bolted directly together or sandwiched together using a retainer plate. However, this method of assembly requires additional parts, requires that fasteners secured tot he flanges be hidden by the body panels thereby difficult to access, and this method does not allow for different rates of thermal expansion and hydroscopic growth.

It would be desirable to provide an attachment of adjacent plastic outer body panels in a manner which allows ease of assembly and enables thermal and hydroscopic growth of the plastic panels while permitting the body outer panels to preserve a distortion-free appearance.

SUMMARY OF THE INVENTION

This invention provides a first plastic body panel having an appearance surface and an adjoining edge. The body panel has a tongue projecting from the adjoining edge generally parallel and recessed from the appearance surface. The tongue has an appearance side and a hidden side with the hidden side having a plurality of ribs. A second plastic body panel has an appearance panel including an appearance surface and an adjoining edge. The second plastic body panel has an inboard "L" shaped flange spaced and generally parallel to the appearance panel at the adjoining edge. The appearance panel and the flange of the second body panel define a slot at the adjoining edge for receiving the tongue of the first plastic body panel for slideably connecting the panels with the ribs of the tongue engaging the inboard "L" shaped flange. The appearance surfaces are coplanar at the adjoining edges whereby the panels can move relative to each other while maintaining eh appearance surfaces coplanar at the adjoining edges.

One object, feature and advantage resides in the provision of a pair of plastic panels, one of the plastic panels having a tongue projecting longitudinally which is received by a slot in the other plastic panel for locating eh appearance surfaces of the panels coplanar with each other at the adjoining edges while allowing for relative longitudinal movement of the panels to each other.

Another object, feature and provision is the tongue having a plurality of ribs on a hidden side allowing for relative longitudinal movement of the panels and ensuring the coplanarity of the appearance surfaces of the panels at the adjoining edges while preventing the impression of the ribs from being visible on the appearance surface.

Further objects, features and advantages of the present invention will become more apparent to those skilled in the art as the nature of the invention is better understood from the accompanying drawings and detailed description.

BRIEF DESCRIPTION OF THE DRAWINGS

FIG. 1 is a fragmentary view of a front quarter of a motor vehicle prior to installation of the front fascia;

FIG. 2 is a side elevational view of the vehicle prior to installation of the front fascia;

DESCRIPTION OF THE PREFERRED EMBODIMENT

Figure 3:
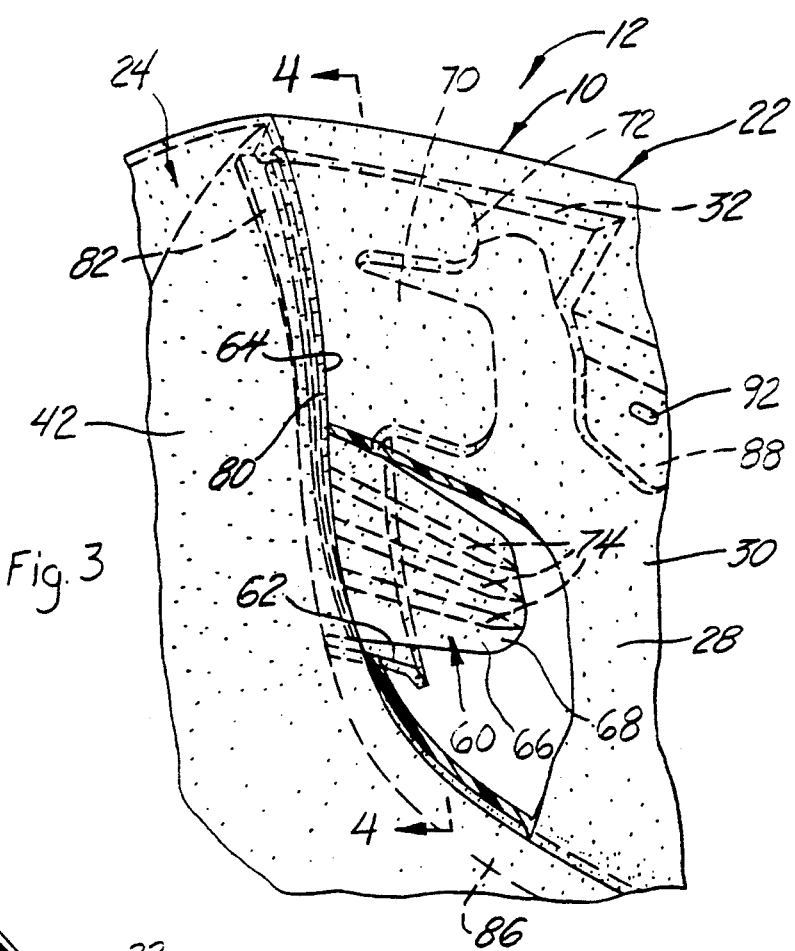
FIG. 3 is a side elevational view, similar to FIG. 2, with the front fascia installed and with the fender broken away and in section to show the tongue of the fascia in relation to the slot of the fender.

Referring now to FIG. 1, there is shown a front end 10 of a vehicle 12 including a front inner structure 14 of stamped steel. A front end panel reinforcement 16, which carries a set of headlights 18, is secured to the front of the front inner structure 14. Likewise, an underlying metal bumper impace beam 20 is secured to the front inner structure 14. A front fender 22 and a front fascia or bumper fascia 24 cover the front end 10 including the front inner structure 14, the front end panel reinforcement 16 and the bumper impact beam 20.

The front fender 22 of molded plastic has an appearance panel 28 with an outer appearance surface 30. An upper flange 32 of the front fender 22 is secured to the front inner structure 14 typically by a bolt extending from a longitudinal slot in the flange 32 of the fender 22 to a hole in the front inner structure 14, thereby allowing the front fender 22 to expand and contract in a longitudinal direction. There are many methods of securing molded plastic panels to the front inner structure, and several methods are disclosed in prior patents such as Bien U.S. Pat. No. 4,973,102; Shelton U.S. Pat. No. 4,607,877; Zaydel U.S. Pat. No. 4,597,153; Zaydel U.S. Pat. No. 4,438,971; and Lidstrom U.S. Pat. No. 3,875,661.

Referring to FIG. 1, the front or bumper fascia 24 of molded plastic has an appearance surface 42. An upper generally horizontal edge 44 of the front fascia 24 overlies the front end panel reinforcement 16 and an underlying portion 46 of the front fascia 24, shown in hidden line, engages the rear of the bumper impact beam 20.

The upper edge 44 of the front fascia 24 has a central hole, not shown, and a plurality of slots 48 which align with a plurality of holes 50 in the front end panel reinforcement 16. A plurality of plastic fasteners or rivets 52 are placed into the slots 48 and the respective aligned holes 50 for securing the front fascia 24 to the front end panel reinforcement 16. Likewise, a plurality of fasteners are received by a plurality of slots on the underlying portion 46 of the front fascia 24 and a plurality of aligned holes on a rear surface of the bumper impact bar 20. The slots 48 in the front fascia 24 allow the front fascia 24 to slide transversely relative to the front inner structure 14, thereby compensating for different rates of thermal expansion and hydroscopic growth between the parts.

Figure 4:
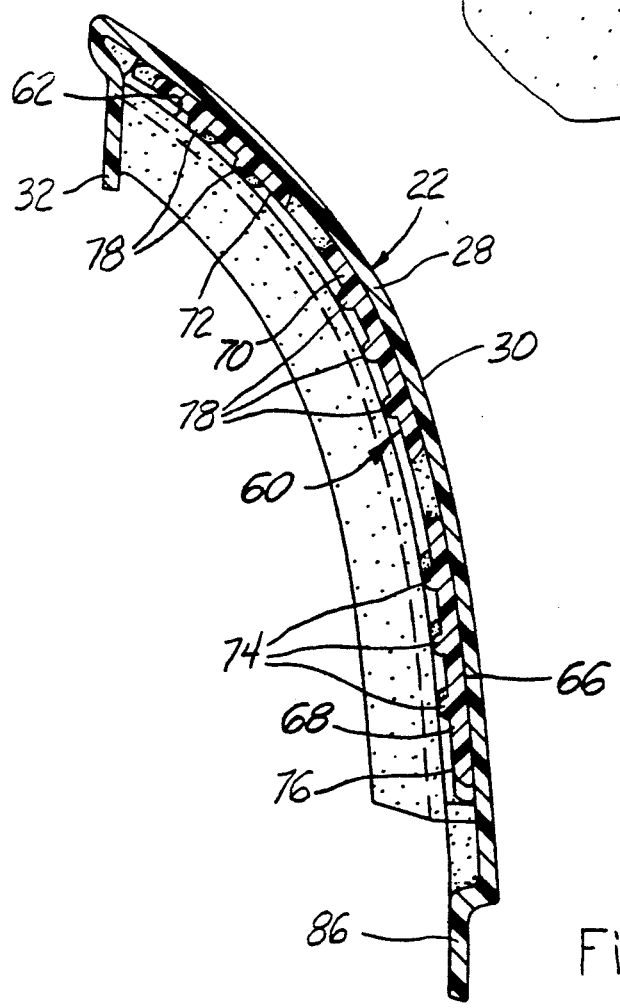
FIG. 4 is a sectional view taken in the direction of the arrows 4—4 in FIG. 3.

Referring to FIG. 1, as the front fascia 24 is being placed on the front of the vehicle 12, a tongue 60 on the front fascia 24 is received in a slot 62 in the front fender 22. Referring to FIG. 2, the tongue 60 projects longitudinally from an adjoining edge 64 of the front fascia 24 and is inwardly offset from the appearance surface 42 by a distance equal to the thickness of the appearance panel 28 of the front fender 22. The tongue 60 is generally parallel with the appearance surface 42 at the adjoining edge 64 and has an appearance side 66 with a similar texture and color as the appearance surface 42. The tongue 60 has a plurality of fingers 68, 70 and 72. Finger 68 has three longitudinal ribs 74 located on a hidden side 76 of the tongue 60 as seen in FIG. 4. The other fingers 70 and 72 also have a plurality of ribs 78 on the hidden side 76.

Referring to FIGS. 2 and 4, the slot 62 on the fender 22 is located on an adjoining edge 80 and formed by the appearance panel 28 and an inboard "L" shaped flange 82, which is spaced parallel to the appearance panel 28. The inboard "L" shaped flange 82 is connected to the appearance panel 28 at the ends of the slot 62 by the upper flange 32 and an offset portion 86 of the fender 22. Referring to FIGS. 2 and 4, the offset portion 86 is spaced inwardly from the appearance surface 30 of the fender 22 by a distance equal to the thickness of the front fascia 24. The tongue 60 and slot 62 connection holds the appearance surfaces 30 and 42 flush in the transverse direction by the ribs 74 and 78 of the fingers 68, 70 and 72 engaging the inboard "L" shaped flange 82 to align the appearance surfaces 30 and 42. Any impression of the ribs 74 and 78 that is transmitted through the front fender 22 is transmitted through the inboard "L" shaped flange 82 and not through to the appearance surface 30. In the vertical direction, the tongue 60 and slot 62 connection holds the appearance surfaces 30 and 42 flush by the finger 72 engaging the upper flange 32 and the finger 68 engaging the offset portion 86. However, the tongue 60 and slot 62 connection allows the fascia 24 and fender 22 to expand in the longitudinal direction at different rates. No fasteners are required and, likewise, no access to the hidden side.

Referring to FIG. 1, a tab 88 on a headlight opening surface 90 of the front fascia 24 has a slot 92 which aligns with a hole 94 on the upper flange 32 of the front fender 22; a fastener 96 is received by the hole 94 and the slot 92 to retain the headlight opening surface 90 of the front fascia 24 to the front fender 22.

Figure 5:
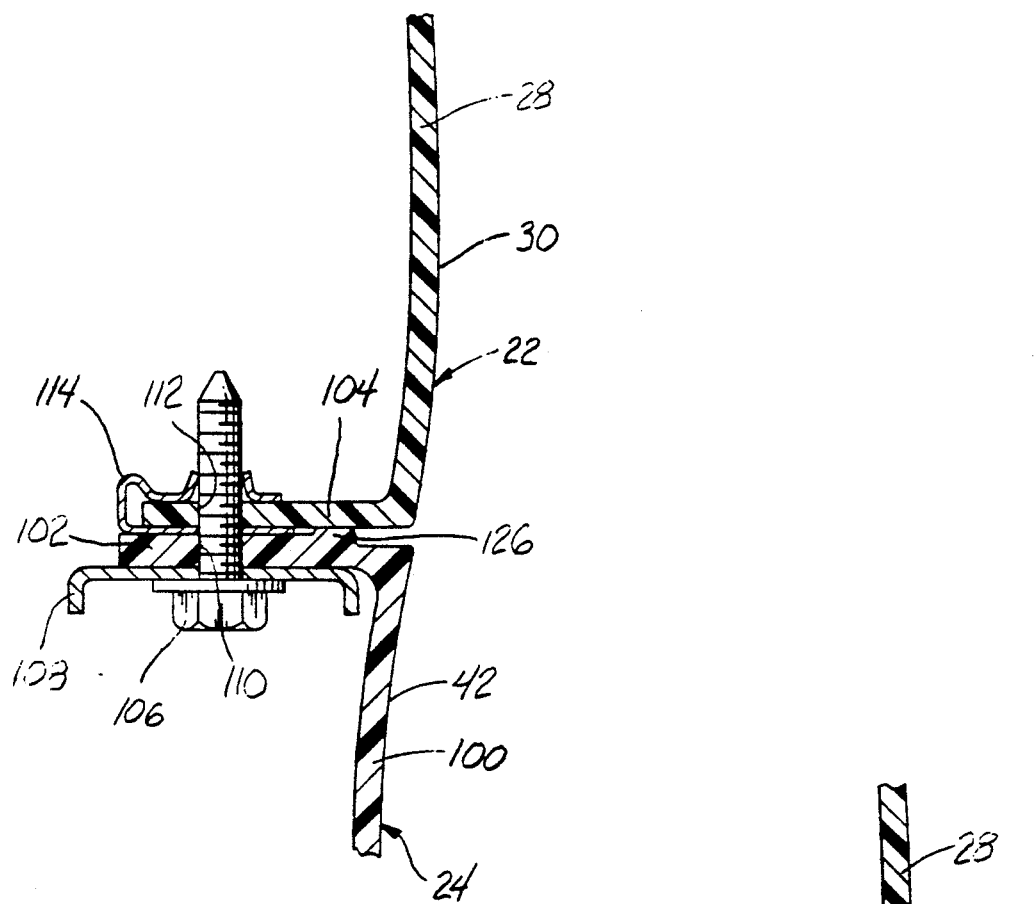
FIG. 5 is a sectional view taken in the direction of the arrows 5—5 in FIG. 1.
Figure 6:
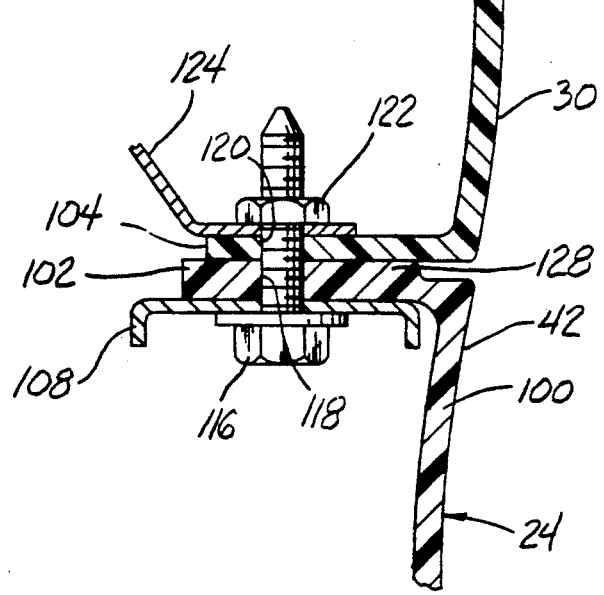
FIG. 6 is a sectional view taken in the direction of the arrows 6—6 in FIG. 1.

Referring to FIG. 1, a fascia extension 100 of the front fascia 24 extends longitudinally rearward and has an upper flange 102 which engages a lower flange 104 of the front fender 22. Referring to FIG. 5, a bolt 106 extending through a metal retainer 108, a slot 110 in the upper flange 102, a hole 112 in the lower flange 104 of the front fender 22 and received by a metal "J" nut 114 secures the fasica extension 100 to the front fender 22. Referring to FIG. 6 likewise a bolt 116 extends through the metal retainer 108, a slot 118 in the fascia extension 100 and a slot 120 in the front fender 22 and is received by a nut 122 at one end of a mounting bracket 124 to secure the fascia extension 100 to the front fender 22. The mounting bracket 124 connects at the other end to the inner front structure 14 to position the fascia extension 100 and the front fender 22 relative to the inner front structure 14. Referring to FIGS. 5 and 6, a pair of nubs 126 and 128 protrude upward from the upper flange 102 of the fascia extension 100 and engage the lower flange 104 of the fender 22 for vertically spacing the appearances surfaces 30 and 42 of the fender 22 and the fascia 24 for styling.

Referring to FIGS. 1 and 4, the offset portion 86, which connects the lower end of the inboard "L" shaped flange 82 to the appearance panel 28, extends towards the lower flange 114 and engages the front fascia 24 to retain the appearance surfaces 30 and 42 flush by preventing the appearance surface 42 of the front fascia 24 from flexing inboard.

During the life of the vehicle 12, the front fender 22 and the front fascia 24 will expand and contract due to changes in temperature and humidity. The tongue 60 and slot 62 connection allows for the contraction and expansion while appearance surfaces 30 and 42 are flush in both the transverse direction and the vertical direction at the adjoining edges 64 and 80. The tongue 60 with the same color and texture as the appearance surfaces 30 and 42 minimizes the visual effect of any gap created between the appearance surfaces 30 and 42. The vehicle 12 could be designed to always have a small gap between the appearance surfaces 30 and 42 of the front fender 22 and the front fascia 24 similar to the vertical spacing shown in FIGS. 5 and 6. The slots 110 and 118 in the upper flange 102 of the fascia extension 100 also allow the front fender 22 and front fascia 24 to expand and contract longitudinally at different rates.

The ribs 74 and 78 on the fingers 68, 70 and 72 can be tailored during the start of manufacturing to adjust for the width of the slot 62 to ensure that the appearance surface 30 and 42 are coplanar at the adjoining edges 64 and 80. In addition, the ribs 74 and 78 add longitudinal stiffness to the tongue 60 and also are tapered to ease the insertion of the tongue 60 into the slot 62.

While only the left front fender 22 is shown, the front fascia 24 is attached to a right front fender of the vehicle in an identical way.

While an embodiment of the present invention has been explained, various modification within the spirit and scope of the following claims will be readily apparent to those skilled in the art.

We claim:
1. A motor vehicle having:
 a first plastic body panel having an appearance surface and an adjoining edge and a tongue projecting from the adjoining edge generally offset and parallel to the appearance surface; and
 a second plastic body panel having an appearance surface and an adjoining edge and the adjoining edge having a slot for slideably receiving the tongue of the first plastic body panel for slideably interconnecting the panels with their appearance surfaces coplanar at the adjoining edges whereby the panels can slideably move relative to each other while maintaining the appearance surfaces coplanar at the adjoining edges.

2. The combination comprising:

a first plastic body panel having an appearance surface and an adjoining edge and the body panel having a tongue projecting from the adjoining edge generally inwardly offset and parallel to the appearance surface and the tongue having an appearance side and a hidden side and the hidden side having a plurality of ribs; and second plastic body panel having an appearance panel including an appearance surface and an adjoining edge and the second plastic body panel having an inboard "L" shaped flange spaced and generally parallel to the appearance panel at the adjoining edge and the appearance panel and inboard "L" shaped flange defining a slot at the adjoining edge for receiving the tongue of the first plastic body panel for slideably connecting the panels with the ribs of the tongue engaging the inboard "L" shaped flange so that the appearance surfaces are coplanar at the adjoining edges whereby the panels can move relative to each other while maintaining the appearance surfaces coplanar at the adjoining edges.

3. The combination comprising:

a plastic fascia body panel having an appearance surface and a generally vertical adjoining edge and the fascia body panel having a tongue projecting longitudinally from the adjoining edge and generally inwardly offset and parallel to the appearance surface of the adjoining edge and the tongue having an appearance side and a hidden side and the hidden side having a plurality of longitudinal ribs and the fascia body panel having a fascia extension which extends longitudinally under the tongue and the fascia extension having an upper flange;

a plastic fender body panel having an appearance panel including an appearance surface and an adjoining edge and the fender body panel having an inboard "L" shaped flange spaced and generally parallel to the appearance panel at the adjoining edge and the appearance and inboard "L" shaped flanges defining a slot at the adjoining edge for receiving the tongue of the plastic fascia body panel for longitudinally slideably connecting the body panels with the ribs of the tongue engaging the inboard "L" shaped flange so that the appearance surfaces are coplanar at the adjoining edges and the plastic fender body panel having a lower flange; and fastening means for slideably connecting the upper flange of the fascia extension to the lower flange of the fender body panel whereby the body panels can move longitudinally relative to each other while maintaining the appearance surfaces coplanar at the adjoining edges.

* * * * *